(12) United States Patent
Weyerhaeuser et al.

(10) Patent No.: US 8,838,579 B2
(45) Date of Patent: *Sep. 16, 2014

(54) DATA FLOW GRAPH OPTIMIZATION USING ADAPTIVE RULE CHAINING

(75) Inventors: Christoph Weyerhaeuser, Heidelberg (DE); Tobias Mindnich, Walldorf (DE); Daniel Baeumges, Viersen (DE); Gerrit Simon Kazmaier, Heidelberg (DE)

(73) Assignee: SAP AG, Walldorf (DE)

( * ) Notice: Subject to any disclaimer, the term of this patent is extended or adjusted under 35 U.S.C. 154(b) by 147 days.

This patent is subject to a terminal disclaimer.

(21) Appl. No.: 13/457,354

(22) Filed: Apr. 26, 2012

(65) Prior Publication Data

US 2013/0290298 A1 Oct. 31, 2013

(51) Int. Cl.
G06F 17/30 (2006.01)

(52) U.S. Cl.
USPC ............................ 707/718; 707/717; 707/719

(58) Field of Classification Search
CPC ................... G06F 17/30463; G06F 17/30466; G06F 17/30469
USPC ................................. 707/719, 713, 717, 718
See application file for complete search history.

(56) References Cited

U.S. PATENT DOCUMENTS

| | | | |
|---|---|---|---|
| 6,205,441 B1* | 3/2001 | Al-omari et al. ....................... 1/1 |
| 6,484,162 B1 | 11/2002 | Edlund et al. | |
| 6,618,719 B1 | 9/2003 | Andrei | |
| 7,895,192 B2* | 2/2011 | Mehta et al. ................... 707/719 |
| 2003/0187831 A1 | 10/2003 | Bestgen et al. | |
| 2005/0108554 A1* | 5/2005 | Rubin et al. .................. 713/187 |
| 2006/0047636 A1* | 3/2006 | Mohania et al. .................. 707/3 |
| 2006/0212418 A1 | 9/2006 | Dettinger et al. | |
| 2010/0306188 A1 | 12/2010 | Cunningham et al. | |
| 2011/0295833 A1* | 12/2011 | Narasayya et al. ........... 707/713 |
| 2012/0089596 A1* | 4/2012 | Siddiqui et al. ............... 707/718 |

FOREIGN PATENT DOCUMENTS

EP 2386965 A1 11/2011

OTHER PUBLICATIONS

Bizarro, Pedro et al., "Progressive Parametric Query Optimization", IEEE Transactions on Knowledge and Data Engineering, vol. 21, No. 4, Apr. 1, 2009.

Martinez-Medina, Lurdes Angelica et al., "Query optimization using case-based reasoning in ubiquitous environments", 2009 Mexican International Conference on Computer Science (ENC), Sep. 21, 2009.

European Search Report and Written Opinion dated Mar. 5, 2012, issued by the European Patent Office in connection with corresponding EP Application No. 11004965.7.

Elmasri, Ramez, and Navathe, Shamkant B. (eds). Chapter 19: Algorithms for Query Processing and Optimization. Jan. 1, 2011. *Fundamentals of Database Systems (Sixth Edition)*. Addison-Wesley. pp. 679-725. XP009171423.

* cited by examiner

*Primary Examiner* — Cam-Y Truong
(74) *Attorney, Agent, or Firm* — Mintz Levin Cohn Ferris Glovsky and Popeo, P.C.

(57) ABSTRACT

A query is received and an initial data flow graph comprising a plurality of nodes is generated for executing the query. The initial data flow graph is optimized using a model optimizer that accesses at least one of a plurality of patterns to identify a matching pattern and executes at least one optimization rule associated with a matching pattern. Execution of the query is then initiated using the optimized data flow graph. Related apparatus, systems, techniques and articles are also described.

16 Claims, 9 Drawing Sheets

DATA FLOW GRAPH OPTIMIZATION USING ADAPTIVE RULE CHAINING

TECHNICAL FIELD

The subject matter described herein relates to data flow graph optimization using adaptive rule chaining. In particular, a model optimizer identifies matching patterns having corresponding rules as part of the optimization of data flow graphs.

BACKGROUND

Data flow graphs include a plurality of nodes that define how a query is to be executed. Such data flow graphs are sometimes optimized using rules to determining how to change the data flow graph. If the data flow graph is more complex and several rules can be applied, rule-based optimization techniques often apply the wrong rules and/or the rules are applied in an incorrect order. Such instances can occur when one rule changes the preconditions for another rule so that the rule cannot be applied anymore. These cases as well as other situations in which there are conflicting rules typically results in sub-optimal query execution plans.

SUMMARY

In one aspect, a query is received and an initial data flow graph comprising a plurality of nodes is generated for executing the query. The initial data flow graph is optimized using a model optimizer that accesses at least one of a plurality of patterns to identify a matching pattern and executes at least one optimization rule associated with a matching pattern. Execution of the query is then initiated using the optimized data flow graph.

The plurality of patterns can be ranked and accessed by the model optimizer according to the ranking. A variety of ranking criteria can be used such as user-specified criterion and cost-function for executing rules corresponding to the patterns. The cost functions can characterize processing resources required to apply at least one corresponding rule for such pattern.

At least one of the patterns can have a plurality of corresponding rules with such plurality of rules being ranked and accessed by the model optimizer according to the ranking. Similar to patterns, the rules can be ranked according to a variety of criteria such as user-specified criterion and cost functions that characterize processing resources required to apply the corresponding rule.

Each pattern can specify a start node within the initial data flow graph that can be used to determine whether the pattern matches. Each pattern can also specify how many preceding and/or succeeding nodes, if any, to be considered to determine whether the pattern matches.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the current subject matter is advantageous in that by splitting the logic into lightweight patterns and more complex rules, the decision to determine whether a pattern matches consumes less processing resources as compared to conventional techniques. In addition, optimizations of data flow graphs can be performed more rapidly.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
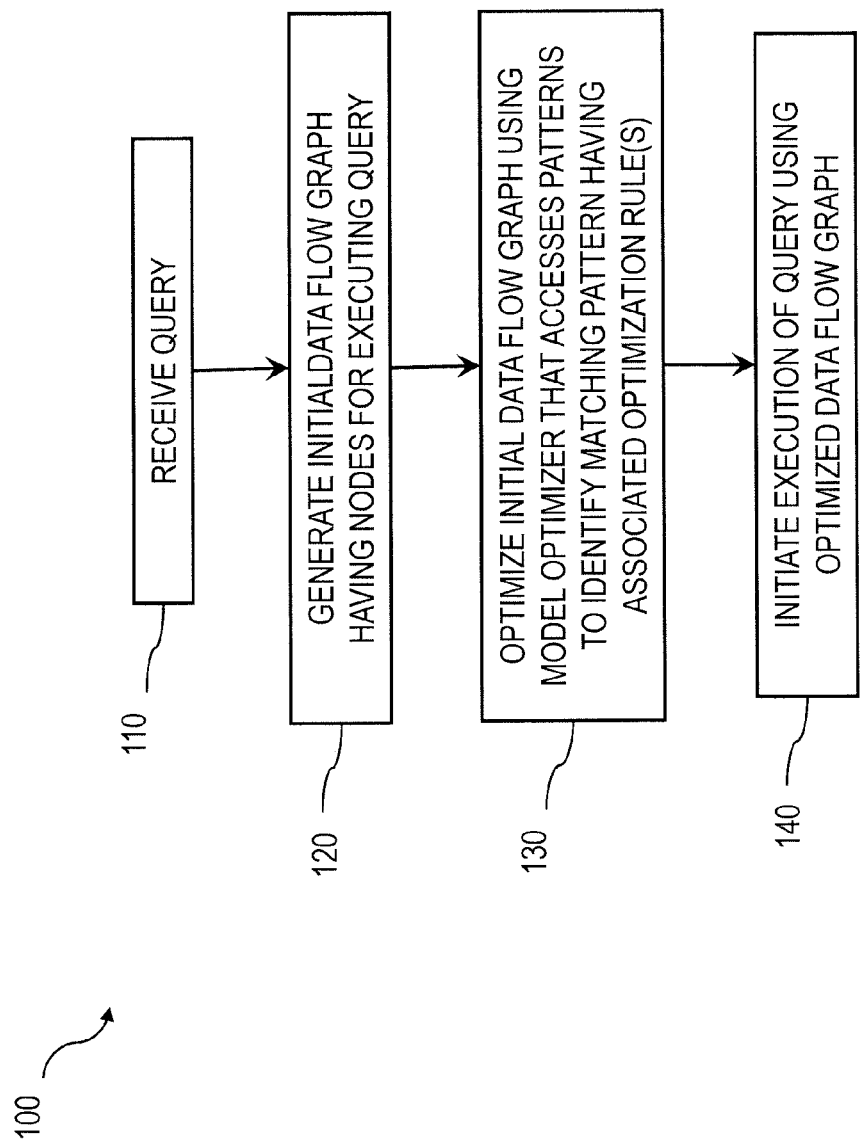
FIG. 1 is a process flow diagram illustrating a method optimizing a data flow graph using adaptive rule chaining.

FIG. 1 is a process flow diagram 100 illustrating a method in which, at 110, a query is received. Thereafter, at 120, an initial data flow graph comprising a plurality of nodes for executing the query is generated. The initial data flow graph is optimized, at 130, using a model optimizer. The model optimizer accesses at least one of a plurality of patterns to identify a matching pattern and executes at least one optimization rule associated with a matching pattern. Subsequently, at 140, execution of the query is initiated using the optimized data flow graph.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

Figure 2:
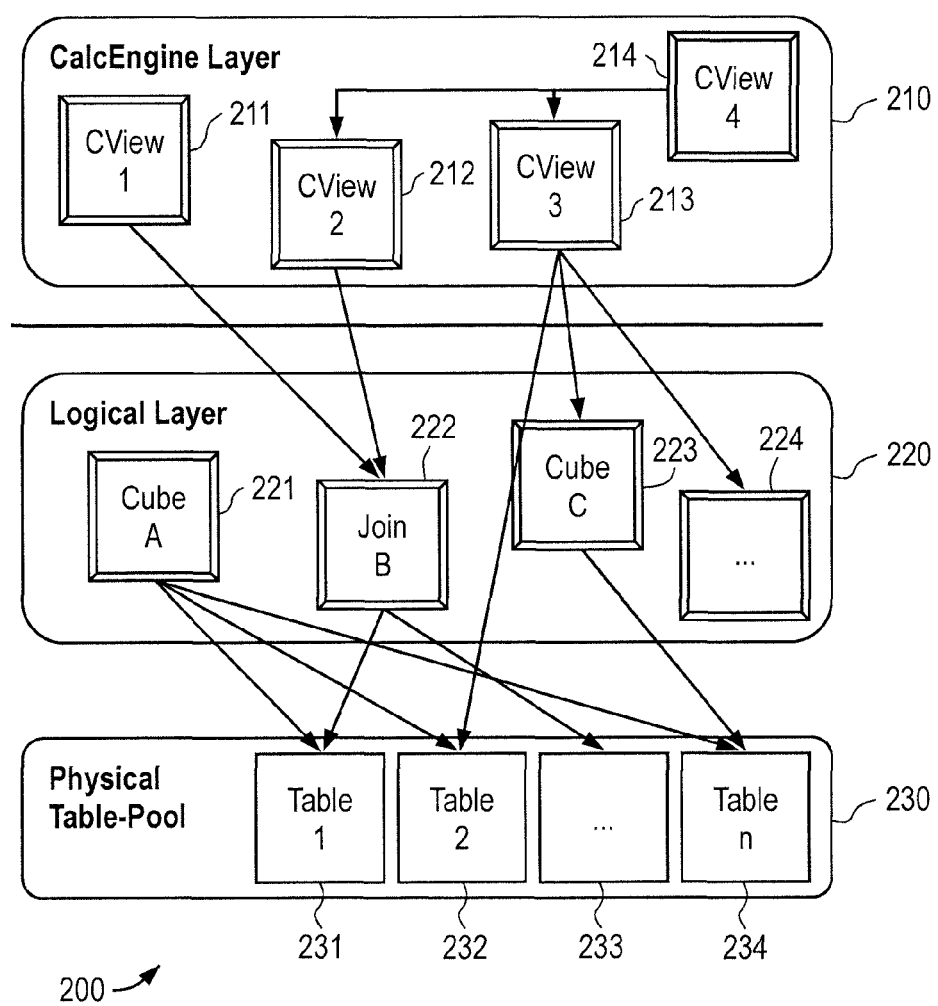
FIG. 2 is a diagram illustrating a calculation engine layer, a logical layer, a physical table pool and their interrelationship.

The current subject matter can be implemented, for example, in connection with a calculation engine environment such as that illustrated in the diagram 200 of FIG. 2. In FIG. 2, illustrated are a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP index) can be assigned roles (e.g., fact or dimension tables) and joined to form a star schema. It is also possible to form join indexes, which can act like database view in environments such as the Fast Search Infrastructure (FSI) by SAP AG.

Calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP indexes or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. Example environments for implementing calculation scenarios can be found, for example, in U.S. patent application Ser. No. 12/914,445, the contents of which are hereby fully incorporated by reference.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Figure 3:
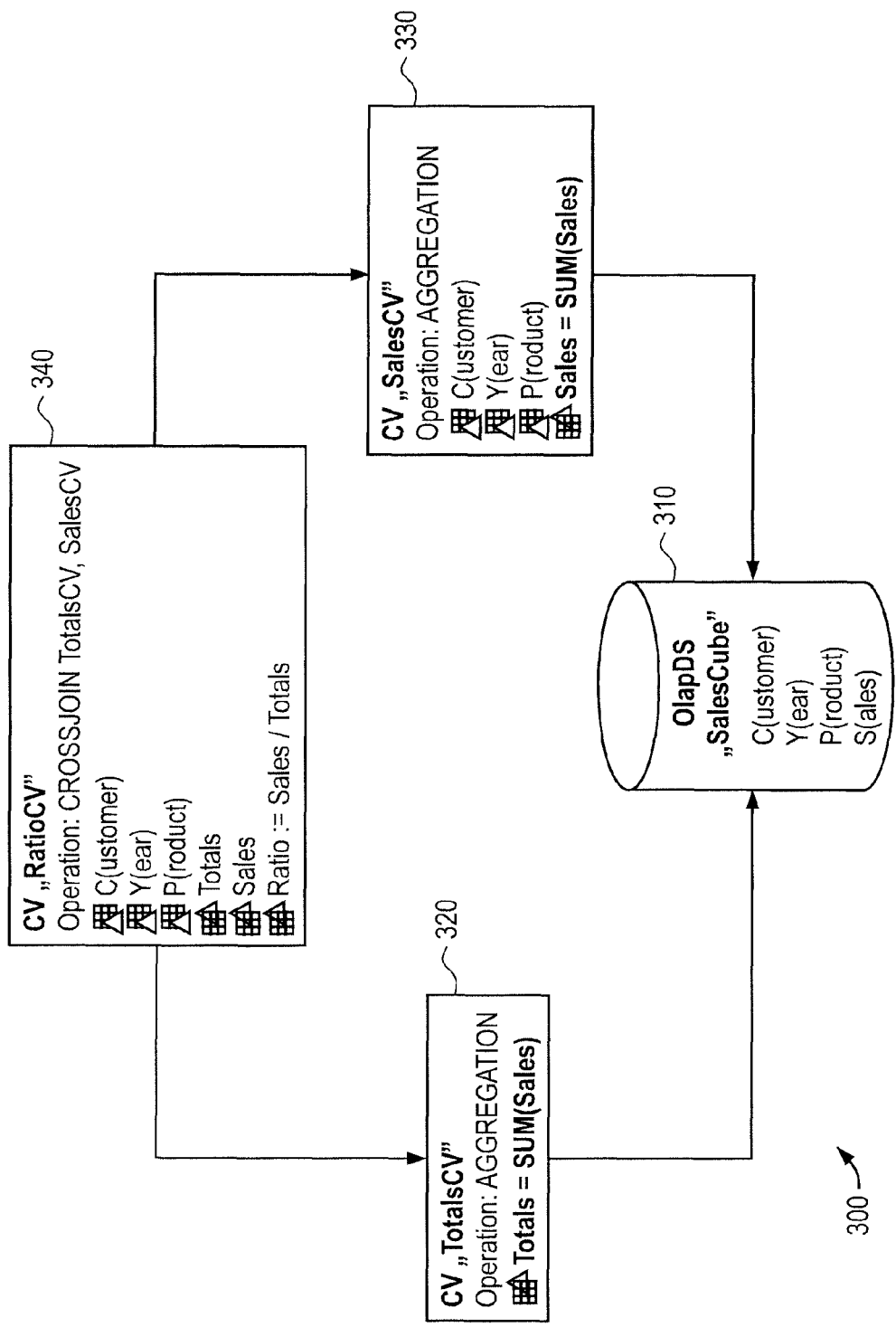
FIG. 3 is a diagram illustrating a first instantiation of a calculation scenario.

FIG. 3 is a diagram 300 illustrating an example of a calculation scenario that relates a number of sales to total sales. With conventional arrangements, such a query can be expressed with several SQL statements but not in a single statement, because for the calculation of the relation two aggregations at different aggregation levels are required. To calculate the number of sales, aggregation is performed by a requested GroupBy attribute. To calculate the sales total, all sales need to be aggregated. Previously this required two separate requests on different SQL view, and the final calculation had to be performed in the application (as opposed to database-side).

For this example, that data source is an OLAP cube "SalesCube" 330, which has the three dimensions Customer, Year, and Product as well as the measure Sales. As stated, this data source 310 can be entered as a special DataSource node in the logical layer 220 in the calculation scenario. The DataSource is now referenced from two calculation nodes. The calculation node TotalsCV 320 on the left side calculates the sales total, by simply summing the sales without any GroupBy attributes. The calculation node SalesCV 330 on the right side calculates the sales according to the GroupBys. To calculate their relationship, the two calculation nodes 320, 330 are joined with each other using a CrossJoin. In the calculation node RatioCV 340 after the join, all the attributes needed for the calculation are available and a new calculated attribute Ratio is provided.

Figure 4:
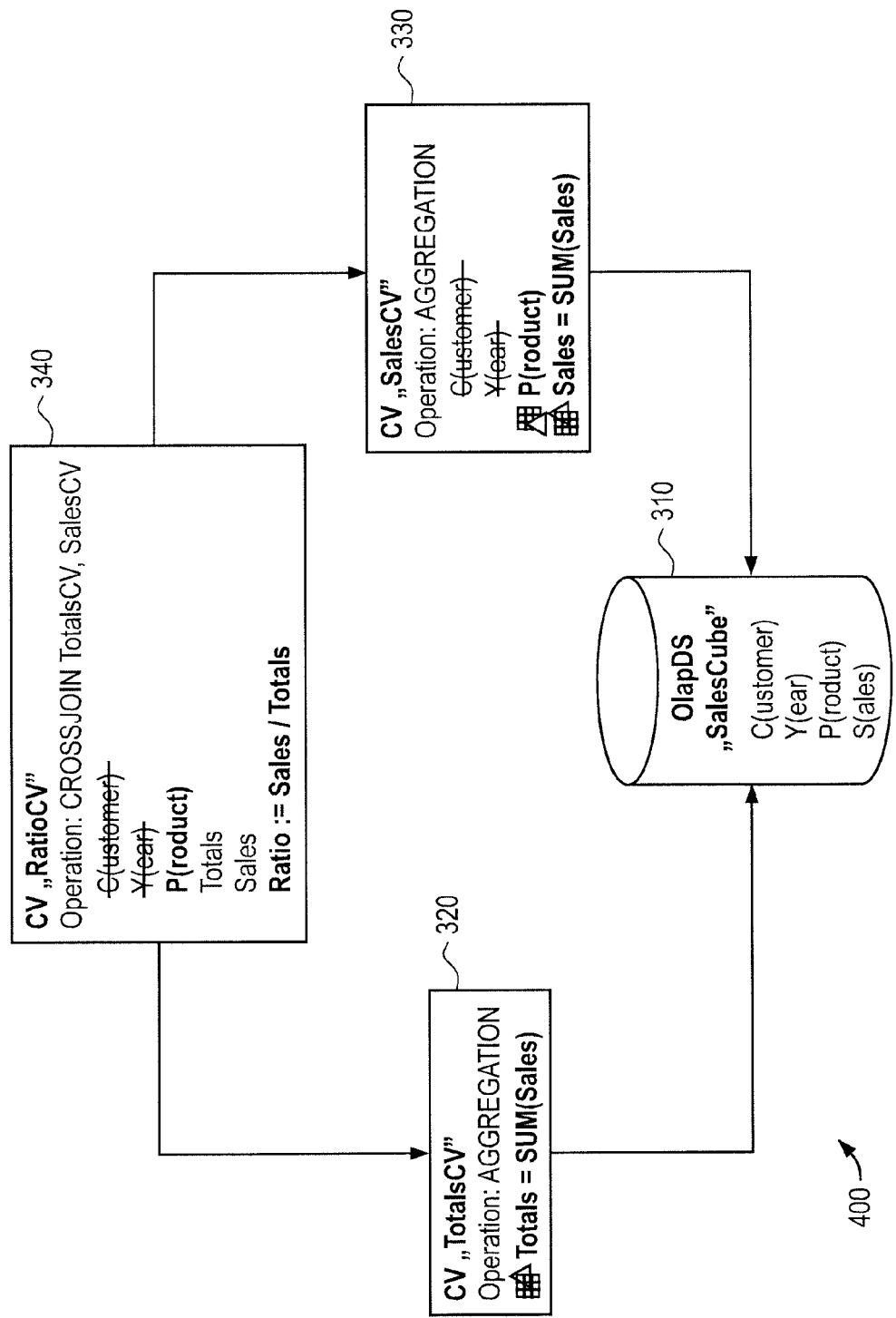
FIG. 4 is a diagram illustrating a second instantiation of a calculation scenario.

The implementation of FIG. 3 is a general calculation scenario. That is, if the calculation scenario is queried via a SQL statement which only requests product as GroupBy attribute, the model is appropriately instantiated and executed. FIG. 4 is a diagram 400 illustrating a variation in which not all of the attributes specified by the calculation nodes 330, 340 are required. In particular, the ratio calculation is for sales relative to total sales without regard to customer and year. In the instantiation, the unnecessary attributes Customer and Year are removed from the calculation nodes RatioCv 340 and SalesCV 330 which accelerates execution of the results (e.g., the ratio) because less data has to be touched (i.e., fewer attributes need to be searched/persisted, etc.).

Figure 5:
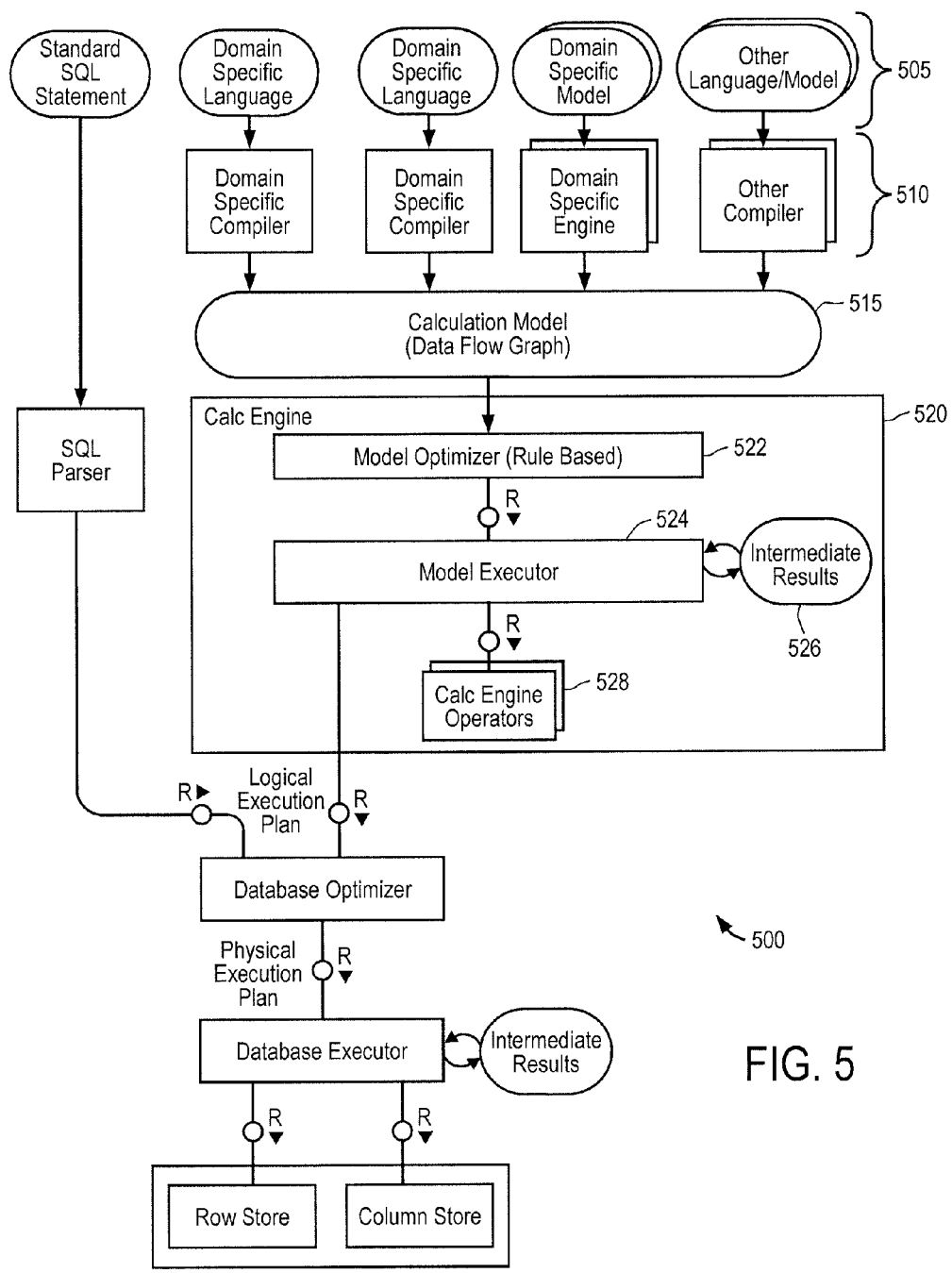
FIG. 5 is a diagram illustrating an architecture for processing and execution control.
Figure 6:
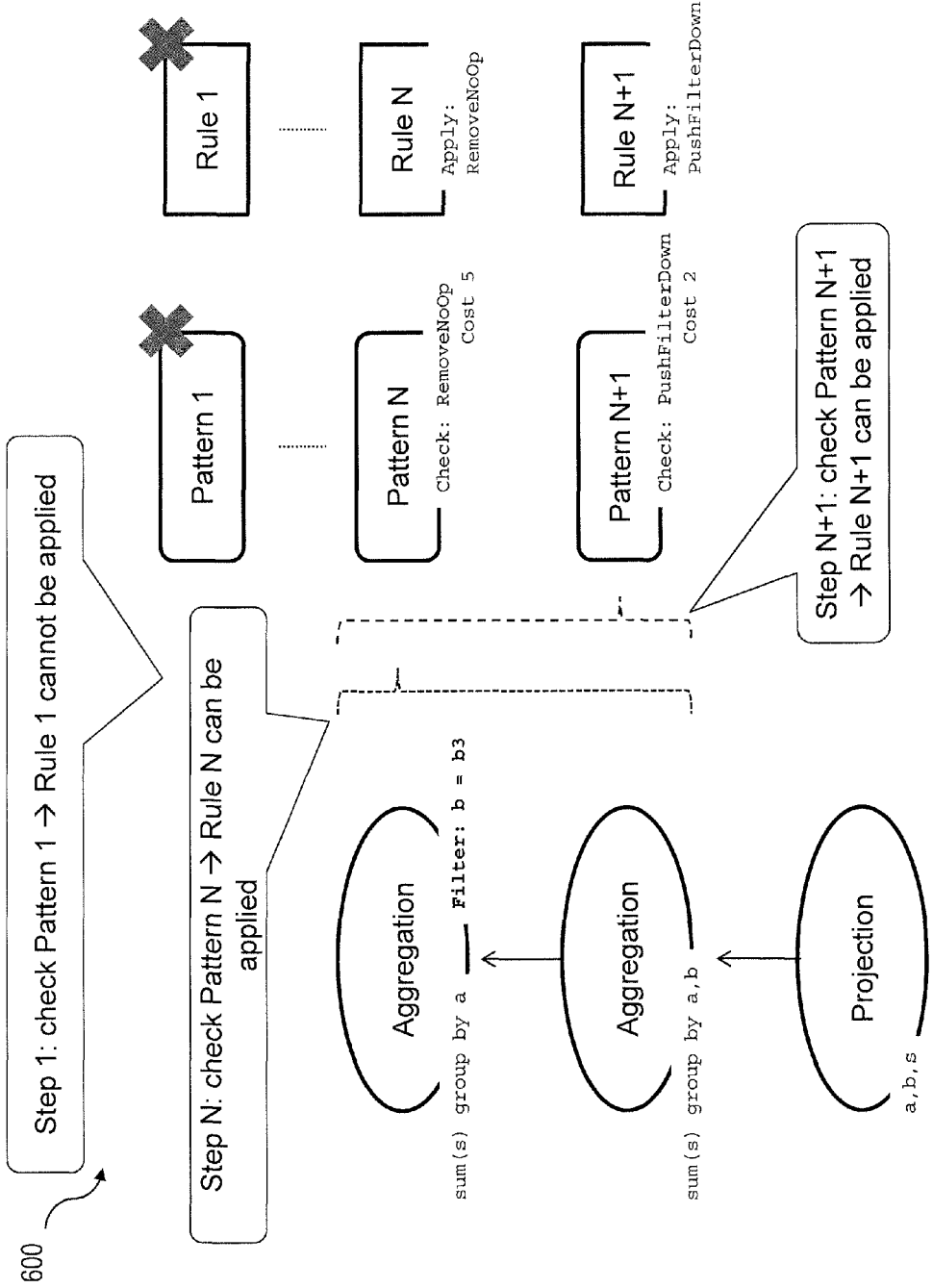
FIGS. 6-9 are diagrams illustrating how patterns are used to determine which rules to apply to optimize a data flow graph.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 515 (illustrated as a calculation model). To achieve enhanced performance, the models and programs written in these languages are executed inside the database server. This arrangement eliminates the need to transfer large amounts of data between the database server and the client application. Once the different artifacts 505 are compiled into this calculation scenario 515, they can be processed and executed in the same manner. The execution of the calculation scenarios 515 (i.e., data flow graphs) is the task of a calculation engine 520.

The calculation scenario 515 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "ALTER SYSTEM ADD SCENARIO <xml OR json representing the scenario>". Once a calculation scenario 515 is created, it can be queried (e.g., "SELECT A, B, C FROM <scenario name>", etc.). In some cases, databases can have pre-defined calculation scenarios 515 (default, previously defined by users, etc.). The calculation scenarios 515 can be persisted in a repository (coupled to the database server) or in transient scenarios, the calculation scenarios 515 can be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

All optimizations performed by the model optimizer 522 can be done on a data flow graph (e.g., calculation scenario, etc.) which comprises several operation nodes. Depending on its operation, each node can consume data from 1 to N sources and its result (after applying its operation on the consumed data) can be exposed to 1 or N consumers. The model optimizer 522 framework walks over all nodes whereas it begins on the top node. This is done in a loop which implies that some nodes may be optimized several times. An example model optimizer can be found in co-pending application Ser. No. 13/457,330 filed on Apr. 26, 2012, the contents of which are hereby fully incorporated by reference.

With the current subject matter, the model optimizer 522 environment can split the detection of an optimization pattern from the application of this pattern into two steps. The objects that detect patterns are very lightweight and are referred to herein as "patterns" and the objects that apply a pattern are referred to herein as "rules". In other optimizers patterns and rules are combined and if the pattern matches, implicitly the rule is applied. With the current approach, the possible space is first determined (via the pattern) and afterwards a best fitting respective most effective rule on a node is applied. Other optimizers would then check again all patterns (including rules and apply the first matching one). With the current implementation, an initial set of patterns can be narrowed by skipping patterns that did not match before the first rules were applied (including the pattern that belongs to the first rule because the rule was applied)

Patterns can have a defined priority that is hard coded or the priorities can, in some implementations, be set dynamically depending on the scenario (the calculation engine 520 can have many users and typically each user creates essentially fixed calculation models which, in turn, can be used to determined which patterns will bring the best query execution plan). Based on this priority the model optimizer 522 can compare different patterns and elect the one with the best optimization. Also, the pattern can return several rules and give each rule a priority. At this point, the model optimizer 522 can then pick the best returned rule for optimization. The priority of the rule can be dynamically estimated by the pattern with respect to the actual data flow graph. This helps to have a precise estimation of the priority of each rule.

Within the data flow graph, a pattern can be assigned a start node. Depending on the kind of pattern only the node itself, the nodes predecessor or even earlier ancestor(s) and/or succeeding nodes can be inspected by the pattern. In a loop over all patterns, for each pattern, the model optimizer 522 can determine if conditions are given that are needed to apply the corresponding rule(s). If the conditions match, the model optimizer 522 can return a list of rules that can be applied (at least one rule); otherwise, the pattern and its rule(s) are skipped. By this a list of possible rules can be created.

Afterwards, the list of rules can be sorted by a rank criterion that is provided by each pattern. Various types of ranking criteria can be used including, for example, hard coded priorities, cost functions, and the like. The top ranked rule can then be applied with the rule applying a change to a node or the graph as a whole or it can perform some further checks and then, if the checks indicate a "go", the changes specified by the corresponding rule can be applied. Rules can, for example, remove operation nodes, combine operation nodes, and/or push down filters to nodes.

The rule can return a value that indicates if changes are done or not. If a rule failed, which means no changes are done so far, the next rule from the rule list can be applied without a previous check by its pattern. If a rule applied changes to a node or the graph, all patterns can be checked again. This time all patterns can be skipped by default that did not match before including the previous matched pattern whose corresponding rule was applied. This is done because of the assumption that these patterns will still not match and the chance is higher that one of the previously matched patterns still matches. Again a list of matching patterns can be assembled and the corresponding rules can be collected. The list of rules can accordingly be sorted by a rank criterion that is provided by each pattern and the top rule can then be applied.

Figure 7:
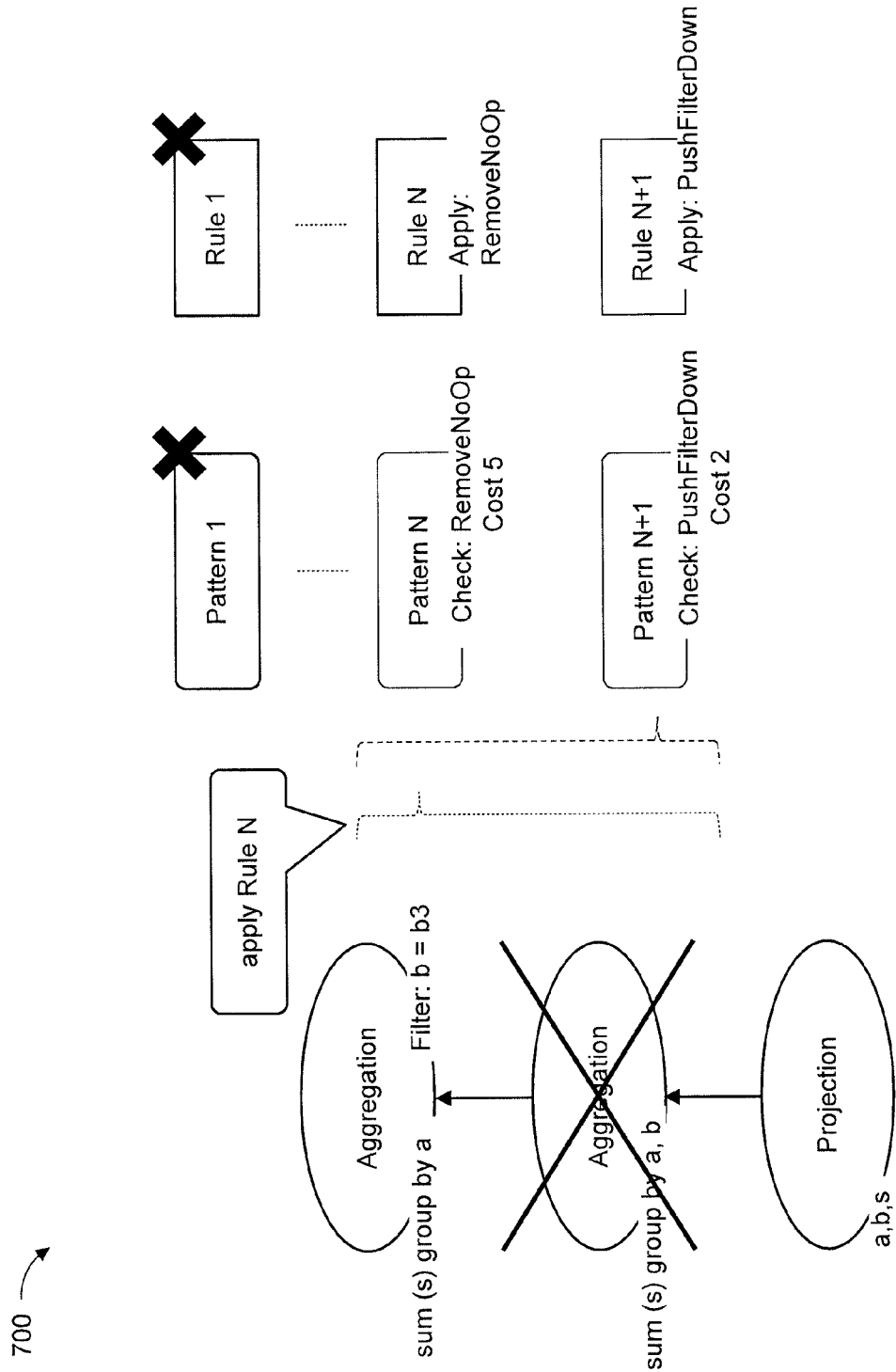
Figure 8:
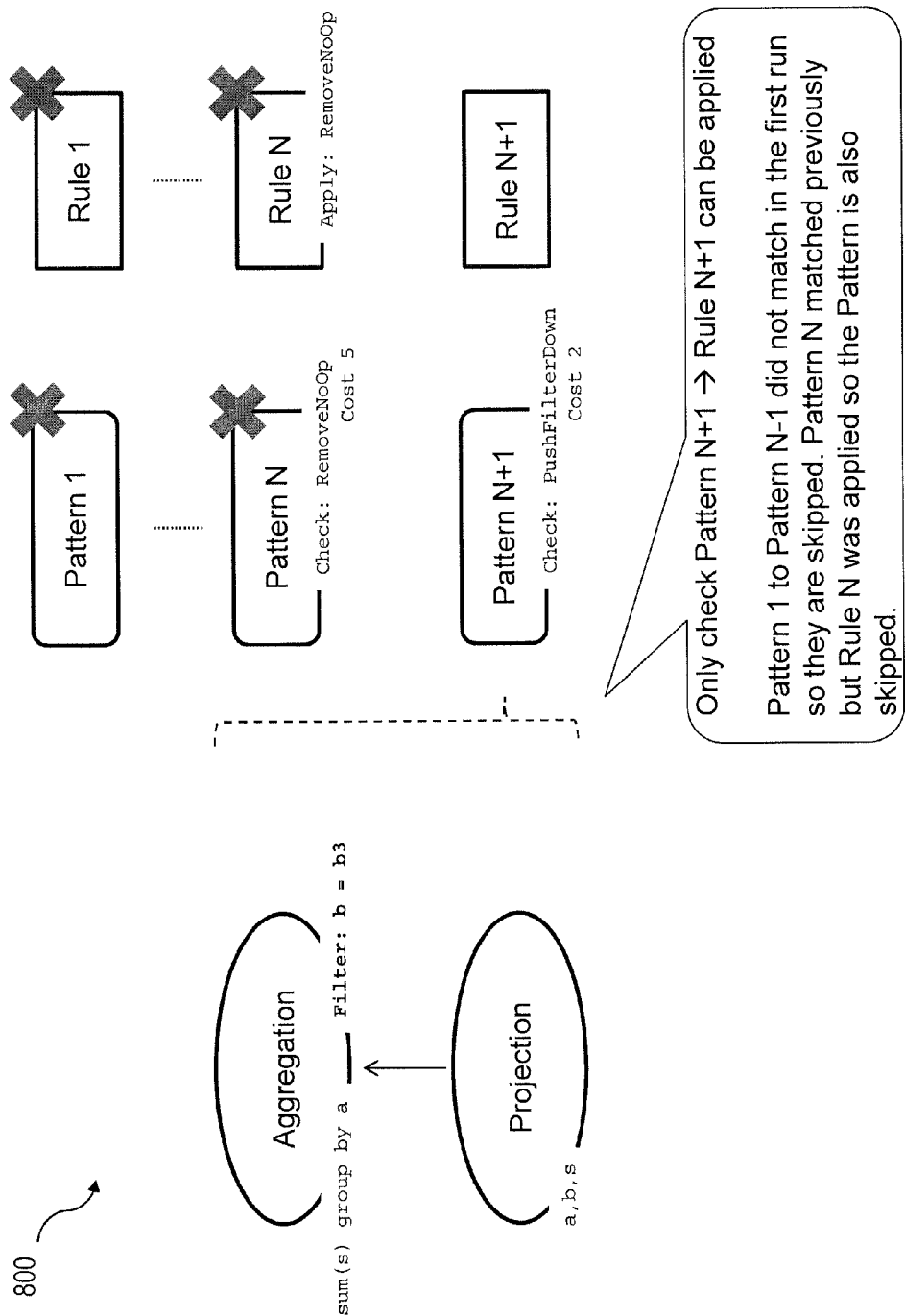
Figure 9:
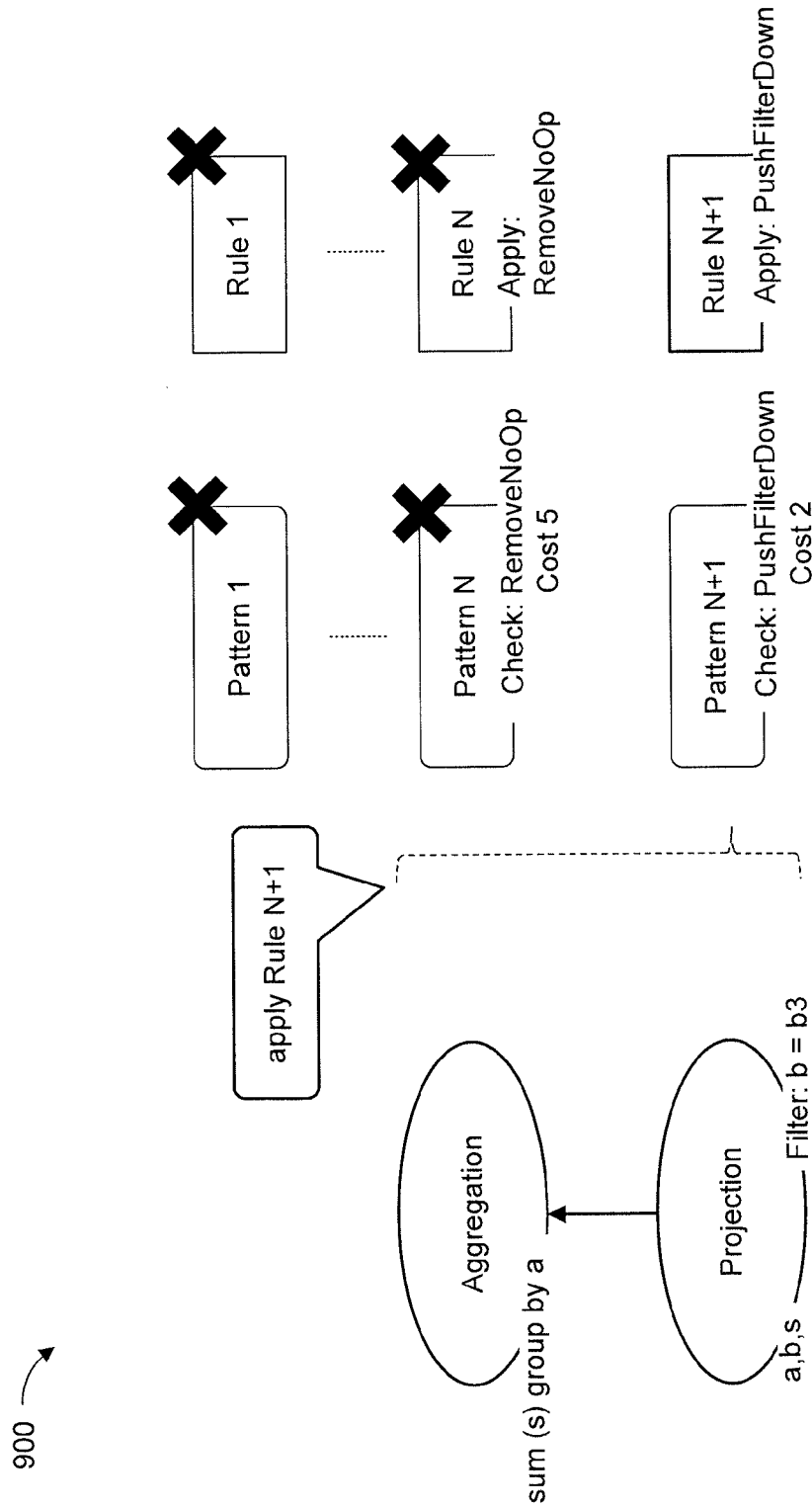

The diagrams 600-900 of FIGS. 6-9 illustrate how patterns can be identified and corresponding rules applied. Starting with the diagram 600 of FIG. 6, it is first determined that pattern 1 and corresponding rule 1 cannot be applied. This process continues until it is determined that pattern N, and as a result, corresponding rule N can be applied. FIG. 7 illustrates that Rule N being applied. Thereafter, with reference to FIG. 8, only pattern N+1 is checked because pattern N previously was a match and the corresponding rule N was applied (resulting in the removal of a node specifying an aggregation operation). Pattern N+1 is identified as being a match and, with reference to FIG. 9, the corresponding rule N+1 can be applied. As will be appreciated, the adaptive rule chaining approach is more efficient in that the identification of patterns requires less computing resources, especially with regard to stepped optimizations (i.e., optimizations in which a first rule modifies at least one node in the data flow graph followed by at least one subsequent rule that modifies at least one node in the modified data flow graph, etc.).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figure(s) and described herein do not require the particular order shown, or sequential order, to achieve desirable results. Other embodiments may be within the scope of the following claims.

What is claimed is:

1. A computer-implemented method comprising:
receiving a query;
generating an initial data flow graph comprising a plurality of nodes for executing the query;
optimizing the initial data flow graph using a model optimizer, the model optimizer (i) accessing each pattern of a first subset of a plurality of patterns until a matching first pattern is first identified and executing at least one first optimization rule of a plurality of optimization rules associated with the matching first pattern and (ii) subsequently accessing each pattern of a second subset of the plurality of patterns until a matching second pattern that is different from the first pattern is second identified and executing the at least one first optimization rule associated with the matching second pattern, the second subset of the plurality of patterns comprising different patterns than the first subset of the plurality of patterns; and
initiating executing of the query using the optimized initial data flow graph;
wherein:
the optimization rule of a plurality of optimization rules identifies a start node in the optimized initial data flow graph from which optimization can be initiated, wherein the optimization rules specify operations to perform on corresponding nodes,
wherein said each pattern of the subsets specifies a start node and how many preceding and succeeding nodes for determining whether pattern matches,
at least a portion of the patterns has priorities that are used by the model optimizer to determine when to execute a particular optimization pattern, the patterns being ranked according to a cost function to execute the optimization rules associated with corresponding pattern, the cost function characterizing processing resources required to apply at least one corresponding optimization rule for pattern.

2. The method as in claim 1, wherein the plurality of patterns are ranked and are accessed by the model optimizer according to ranking.

3. The method as in claim 2, wherein the plurality of patterns are ranked according to user-specified criterion.

4. The method as in claim 1, wherein at least one of the patterns has a plurality of corresponding rules, wherein plurality of rules are ranked and are accessed by the model optimizer according to ranking.

5. The method as in claim 4, wherein the plurality of rules are ranked according to user-specified criterion.

6. The method as in claim 4, wherein the plurality of rules are ranked according to a cost function to execute rule, the cost function characterizing processing resources required to apply at least one rule.

7. The method as in claim 1, wherein each pattern specifies a start node within the initial data flow graph, the start node being used to determine whether the pattern matches.

8. The method as in claim 1, wherein one or more of the receiving, generating, optimizing, and initiating are performed by at least one data processor of at least one computing system.

9. A computer program product comprising a non-transitory computer readable medium storing instructions that, when executed by at least one programmable processor forming part of at least one computing system, cause the at least one programmable processor to perform operations comprising:

receiving a query;

generating an initial data flow graph comprising a plurality of nodes for executing the query;

optimizing the initial data flow graph using a model optimizer, the model optimizer (i) accessing each pattern of a first subset of a plurality of patterns until a matching first pattern is first identified and executing at least one first optimization rule of a plurality of optimization rules associated with the matching first pattern and (ii) subsequently accessing each pattern of a second subset of the plurality of patterns until a matching second pattern that is different from the first pattern is second identified and executing the at least one first optimization rule associated with the matching second pattern, the second subset of the plurality of patterns comprising different patterns than the first subset of the plurality of patterns;

and initiating executing of the query using the optimized initial data flow graph, wherein:

the optimization rule of a plurality of optimization rules identifies a start node in the optimized initial data flow graph from which optimization can be initiated, wherein the optimization rules specify operations to perform on corresponding nodes, wherein said each pattern of the subsets specifies a start node and how many preceding and succeeding nodes for determining whether pattern matches, at least a portion of the patterns has priorities that are used by the model optimizer to determine when to execute a particular optimization pattern, the patterns being ranked according to a cost function to execute the optimization rules associated with corresponding pattern, the cost function characterizing processing resources required to apply at least one corresponding optimization rule for pattern.

10. The computer program product as in claim 9, wherein the plurality of patterns are ranked and are accessed by the model optimizer according to ranking.

11. The computer program product as in claim 10, wherein the plurality of patterns are ranked according to user-specified criterion.

12. The computer program product as in claim 9, wherein at least one of the patterns has a plurality of corresponding rules, wherein plurality of rules are ranked and are accessed by the model optimizer according to ranking.

13. The computer program product as in claim 12, wherein the plurality of rules are ranked according to user-specified criterion.

14. The computer program product as in claim 12, wherein the plurality of rules are ranked according to a cost function to execute rule, the cost function characterizing processing resources required to apply at least such rule.

15. The computer program product as in claim 9, wherein each pattern specifies a start node within the initial data flow graph, the start node being used to determine whether the pattern matches.

16. A system comprising:

one or more data processors; and memory storing instructions, which when executed, cause at least one data processor to perform operations comprising:

receiving a query;

generating an initial data flow graph comprising a plurality of nodes for executing the query;

optimizing the initial data flow graph using a model optimizer, the model optimizer (i) accessing each pattern of a first subset of a plurality of patterns until a matching first pattern is first identified and executing at least one first optimization rule of a plurality of optimization rules associated with the matching first pattern and (ii) subsequently accessing each pattern of a second subset of the plurality of patterns until a matching second pattern that is different from the first pattern is second identified and executing the at least one first optimization rule associated with the matching second pattern, the second subset of the plurality of patterns comprising different patterns than the first subset of the plurality of patterns; and initiating executing of the query using the optimized initial data flow graph, wherein:

the optimization rule of a plurality of optimization rules identifies a start node in the optimized initial data flow graph from which optimization can be initiated, wherein the optimization rules specify operations to perform on corresponding nodes, wherein said each pattern of the subsets specifies a start node and how many preceding and succeeding nodes for determining whether pattern matches, at least a portion of the patterns have priorities that are used by the model optimizer to determine when to execute a particular optimization pattern, the patterns being ranked according to a cost function to execute the optimization rules associated with corresponding pattern, the cost function characterizing processing resources required to apply at least one corresponding optimization rule for pattern.

* * * * *